United States Patent [19]

Kole

[11] Patent Number: 4,782,906
[45] Date of Patent: Nov. 8, 1988

[54] MULTI-WHEEL STEERABLE RIGID FRAME POWER MODULE VEHICLE

[76] Inventor: James S. Kole, 421 San Bruno, Garland, Tex. 75043

[21] Appl. No.: 106,060

[22] Filed: Oct. 7, 1987

[51] Int. Cl.[4] .............................................. B62D 61/10
[52] U.S. Cl. .................................. 180/23; 180/24.08; 180/236
[58] Field of Search ................... 180/22, 23, 24, 24.01, 180/24.08, 24.11, 24.12, 236, 140

[56] References Cited

U.S. PATENT DOCUMENTS

| | | | |
|---|---|---|---|
| 2,748,509 | 6/1956 | Brown et al. | 172/799 |
| 2,906,358 | 9/1959 | Tucker, Sr. | 180/23 |
| 3,180,305 | 4/1965 | Gower-Rempel | 114/270 |
| 3,620,321 | 11/1971 | Thibodeau | 180/16 |
| 4,074,784 | 2/1978 | Lee et al. | 180/24 |
| 4,205,730 | 6/1980 | McColl | 180/261 |
| 4,407,381 | 10/1983 | Oswald et al. | 180/24.12 |

FOREIGN PATENT DOCUMENTS 2029784  3/1980  United Kingdom ................ 180/140

Primary Examiner—Kenneth R. Rice
Attorney, Agent, or Firm—James C. Fails

[57] ABSTRACT

A rigid frame off-highway vehicle in which there are a plurality of wheels on each side, each wheel of each of the plurality of wheels being lockedly connected to the other wheels and commonly connected to a torque delivery source such that the wheels rotate in unison; the wheels being steerable and connected with steering means to operate in a selected steering mode.

3 Claims, 5 Drawing Sheets

MULTI-WHEEL STEERABLE RIGID FRAME POWER MODULE VEHICLE

FIELD OF THE INVENTION

This invention relates to off-highway vehicles. More particularly, this invention relates to an off-highway vehicle having a rigid frame and employing tires or steel wheels, instead of tracks, and having a plurality of the tired wheels or steel wheels on each side, the wheels being steerable.

DESCRIPTION OF THE PRIOR ART

The prior art has seen a wide variety of approaches to off-highway vehicles. Particularly successful has been the Caterpillar approach in which an endless track on each side of the vehicle was employed to impart traction for moving the vehicle forwardly against a load. The disadvantage of the tracks have been their expense and the expense of maintaining the vehicle with the tracks on them.

It has been recognized that vehicles with tires, commonly referred to as tired vehicles, have an economic advantage both from the initial cost point of view and from the maintenance point of view. Consequently, a plurality of wheels on each side of the vehicles have been employed in the past, although these vehicles have been disadvantageous in not providing a constant traction as could be obtained with an endless track approach.

A search through the prior art has revealed the following patents that are pertinent to the concept of this invention. U.S. Pat. No. 2,748,509 describes a six-wheel drive and steer road machine, such as a grader, in which the front wheels are individually steerable and have inclination inducing means so that the road grader could be inclined at an angle. The four rear wheels supporting the engine, however, were remote from the two front wheels and were steered by pivotal action of the frame with respect to the module on which the wheels are mounted. This enabled the vehicle to proceed in a crab mode of operation, an important mode but not the whole way of steering as desired.

U.S. Pat. No. 2,906,358 describes a multi-wheel vehicle in which a plurality of six wheels on each side of a cargo carrier were employed and driven from a single engine mounted on the frame. The wheels were not, however, steerable except by turning the module on which they were mounted with respect to the frame.

U.S. Pat. No. 3,180,305 describes and illustrates a vehicle control system and driving system in which a plurality of, for example, three wheels on each side of a vehicle could be employed to give traction. The wheels were not mounted on a rigid frame, however, and were free to move in a vertical plane so did not develop constant traction for moving the vehicle forwardly. Moreover, the vehicle apparently employed skid steer, since the individual wheels did not appear to be individually steerable.

U.S. Pat. No. 3,620,321 is one of the more pertinent approaches in disclosing a conversion kit for converting a conventional two-wheel drive tractor to a four-wheel drive tractor in which the wheels could be made steerable and individually powered, for example, two on each side. In this approach, however, the wheels were mounted on pivotally movable axles such that the tractor did not have a constant traction as would be experienced by a rigid frame vehicle. Expressed, otherwise, the walking beam on which the individual wheels were mounted to the tractor in this patent allowed the movement in the vertical plane such that the wheels did not develop constant traction.

Other patents such as U.S. Pat. Nos. 2,804,158, 3,666,034, 3,977,693; and 3,983,950 describe off-road type vehicles having a pluralty of wheels on each side but did not have the individual wheels being steerable and have a rigid frame as in this invention. Other patents which are deemed pertinent to this invention are the following:

U.S. Pat. No. 4,074,784, describes an articulated haulage vehicle separate front and rear sections supported on wheels with transversely mounted axles and individually steerable These wheels were not, however, locked together so as to rotate at the same revolutions. Consequently, the vehicle did not have a constant traction and did not have a rigid frame to which the individually steerable wheels was affixed.

U.S. Pat. No. 4,205,730 describes a vehicle having mounting and driving mechanism for individually steerable wheels for a multi-wheel, off-road vehicle. In this patent, the wheel assemblies are referred to as a quadwheel assembly and had specific walking beams disposed in laterally spaced relationship with respect to the longitudinal bed frame. These walking beams moved up and down, but did not allow the constant traction; instead kept the wheels in contact with the ground on uneven terrain or the like.

In addition, the commerical development has seen the development of different approaches such as by Grove in which they employed large hydraulic cranes with multiple steerable wheels on each side of the vehicles, Case International, in which they employed four-wheel drive tractors that had individually steerable wheels, the heavy duty transmission people and even the Melroe Brothers Inc., Longmont, CO, who had employed the transmissions, drives and the like for multiple wheeled skid steer vehicles, These vehicles also, did not employ individually steerable wheels on a rigid frame vehicle such as is employed in this invention.

SUMMARY OF THE INVENTION

It is an object of this invention to provide an off-highway vehicle that has a rigid frame with a plurality of wheels on each side of the frame such that traction of the vehicle remains constant even over rough terrain or if one wheel loses contact with the ground.

It is a specific object of this invention to provide a rigid frame, off-highway vehicle having a plurality of wheels on each side of the frame with the wheels lockedly and commonly connected together such that they rotate in unison and being selectively and individually steerable; yet, remaining supporting the vehicle such that ground traction of the vehicle always remains constant even if one wheel loses contact with the ground.

These and other objects will become apparent from the descriptive matter hereinafter, particularly when taken into conjunction with the appended drawings.

DESCRIPTION OF PREFERRED EMBODIMENTS(s)

Figure 1:
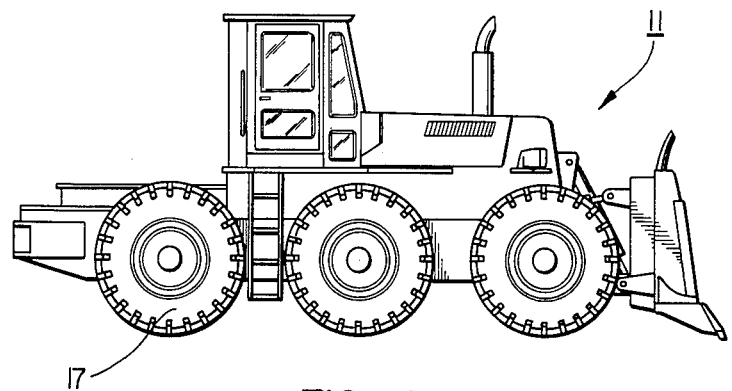
FIG. 1 is a side elevational view of a dozer in accordance with one embodiment of this invention. invention showing the use of a single engine with a plurality of transmissions for transmitting torque to the respective wheels.
Figure 2:
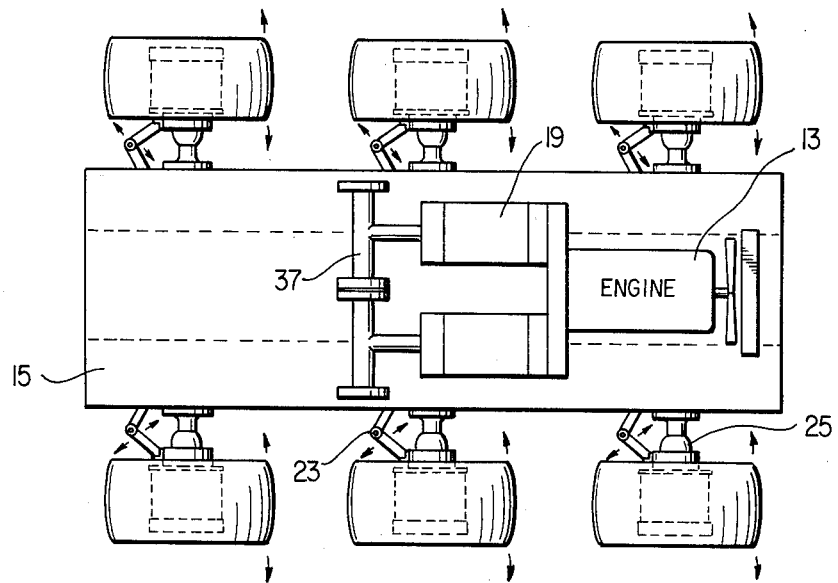

Referring to FIG. 1, an off-highway vehicle, such as a backhoe loader 11 is illustrated. The off-highway vehicle has the usual accoutrements. As can be seen in FIG. 2, the usual accoutrements include a prime power source such as engine 13, a rigid chassis 15, a plurality of wheels 17 supporting the chassis; power transmission means, such as dual transmission means 19, for usably conveying power from the prime mover power source to the wheels; and steering means 21, (FIG. 5), for steering the wheels.

In this invention, the invention comprises having a plurality of the wheels 17 on each side of the rigid chassis with each of the plurality of wheels being lockedly and commonly connected together and to the transmission means such that all the wheels rotate together and only together, or in unison, each of the wheels in the plurality of wheels being mounted also so as to be steerable. Specifically, as can be seen in FIG. 2, each of the wheels 17 is individually steerable by the steering connection 23 and is mounted so as to be steerable, as by way of ball joint 25.

With this arrangement, even if one of the wheels should roll over a depression such as a hole in the ground, the remaining wheels will take up the weight of the vehicle 11 and the ground traction will remain the same so as to move the vehicle forwardly regardless of whether or not all the wheels are in contact with the ground. This has been one of the problems heretofore with tired vehicles, since if one of the vehicles wheels fell into a hole and lost traction, it would spin and rob power from the remaining wheels, even if it continued to bear its share of the vehicle load.

Figure 3:
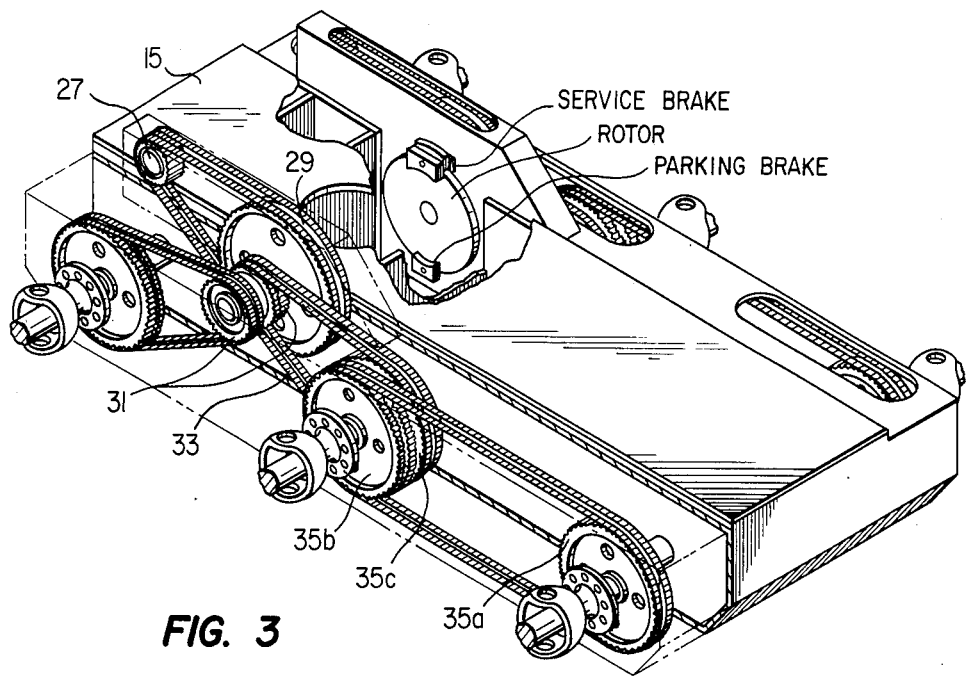
FIG. 3 shows a specific arrangement of one embodiment of invention for lockedly connecting the wheels of the vehicle together so they rotate in unison.

Each of the features individually have been employed in other vehicles heretofore, but they have never been combined before this invention. For example, the interconnection of wheels so that they rotate together responsive to torque from a prime mover was shown in the Melroe M-880 vehicle. FIG. 3 illustrates the concept of employing chains interconnecting respective torque transmitting elements similarly as employed in the Melro M-880. Specifically, the rigid chassis 15 contains a torque delivering means 27 delivered to a master wheel 29. The master wheel then rotates in unison to chain carrying cogs 31 mounted on a common shaft with a master wheel 29. The respective chains, such as chain 33, then carry the torque to other chain cogs such as the wheel chain cogs 35. As can be seen, it frequently is necessary for respective wheel chain cogs to have more than one cog if there is a second wheel connected together on the same end of the master wheel 29. For example, the wheel chain cog 35a is a single cog whereas the wheel chain cog 35b comprises two cogs, such as 35b and 35c, for tranmitting torque by a chain and receiving torque by a chain. In this way, the wheels rotate in unison and always together regardless of whether or not all of the wheels are in contact with the ground or another slippery element like mud that would otherwise allow spinning. Any other mechanically locking means such as gears that would accomplish the foregoing could be employed.

The prime power source such as the engine 13 may comprise any of the conventional engines. It is frequently advantageous to employ large diesel engines in this technology because of economy, ruggedness and low maintenance costs The chassis 15 is rigid in order that falling into a depression of one wheel will not cause that wheel to spin or diminish the weight on the other wheels. In this way, when one wheel clears the ground, the remaining wheels take up the weight of the vehicle to maintain the same ground traction to move in the assigned direction. This is done by simply having a high strength structural framework in the chassis. Ordinarily an off-road vehicle is done with steel girders, beams and the like; or even a box frame like a barge.

The transmission means may include any of the usual means for transmitting torque from the prime power source to drive the wheels in the desired direction. For example, hydrostatic systems are known for developing and transmitting torque. As illustrated, there are dual matched transmissions 19, FIG. 2, for conveying equal torque and rotating the wheels together if they are moved in the same direction as appropriately signalled by the steering means, as described later hereinafter. As illustrated, the transmissions means 19 also includes suitable axles and gears within the axle housing 37 on each side, connected with each of the transmissions 19.

Figure 4:
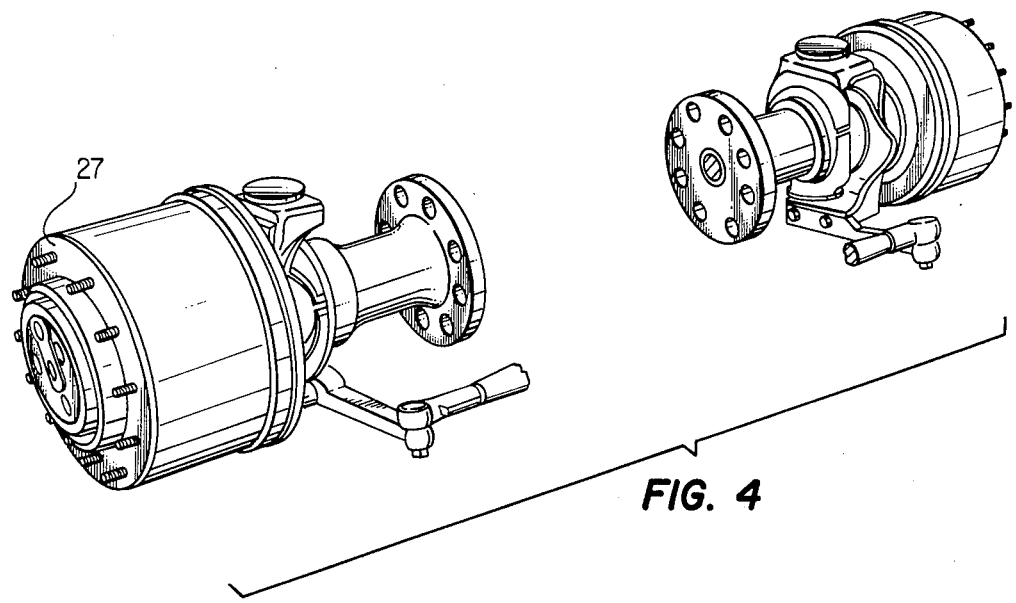
FIG. 4 is an isometric view of a transmission of the prior art for transmitting torque to rotate wheels responsive to force from a prime mover.

FIG. 4 illustrates a typical ball joint steering mechanism. These high strength ball joint steering axles and gearing are well known and culminate in the torque transmission means 27.

Respective wheels 17 may be of the conventional type wheels that have rubber tires on them. It is preferred that the wheels do not have electric motors at their center, since they would be subject to vagaries of electric motors as the prior art has done. Instead, it is preferable that the wheels be simply connected with their shaft so as to rotate in unison with the shaft in response to torque transmitted. Each of the wheels has its periphery bounded by and supported on an inflatable tire or steel wheels in accordance with the prior art.

The wheels are mounted as by way of ball joints which are conventional, so they can be steered as well as powered.

Figure 5:
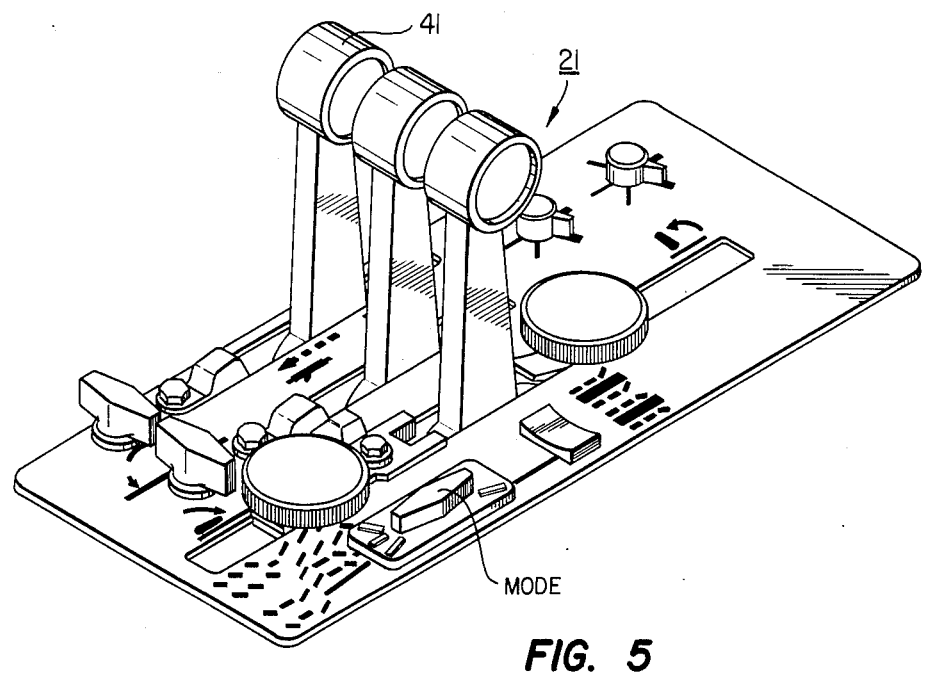
FIG. 5 is an isometric view of a type of steering with a selector for selecting the modes of steering.

The steering means 21, FIG. 5, is a type of priorly employed steering; such as employed on the Case International four-wheel drive tractors to get the steering desired. Specifically, the respective three levers 41 implement the mode of steering selected by the selector 43. The selector 43 selects a mode of steering such as illustrated in FIGS. 6-8. The other control accoutrements also allow implementing the mode of steering selected.

Figures 6A, 6B:
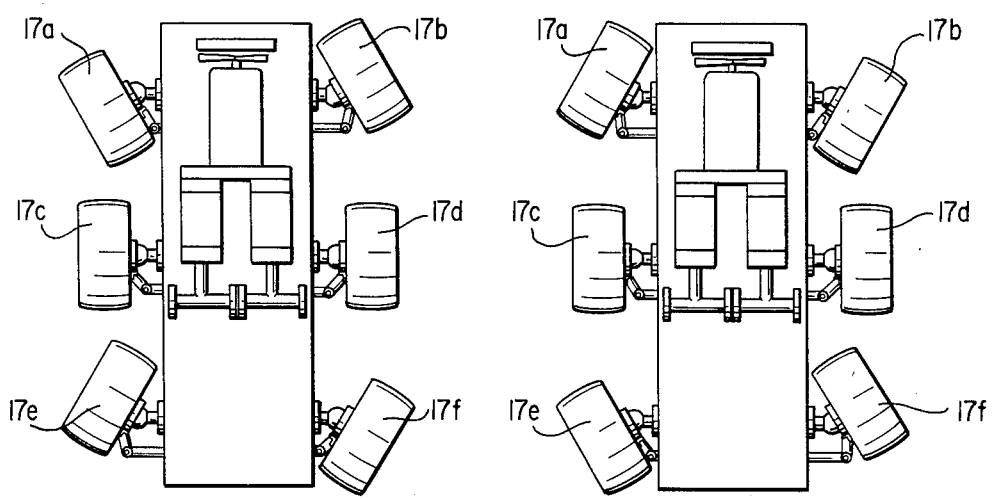
FIG. 6a illustrates a mode of steering in which there is steering to the left.
FIG. 6b indicates a mode of steering where there is steering to the right.

FIG. 6a indicates an enhanced steering to the left in which the two front wheels 17a and 17b are steered to the left. The center wheels 17c and 17d maintain their forward direction. The rear wheels 17e and 17f actually steer to enhance the degree of steering and effect a reduced radius of turn to the left. The converse happens if the mode of FIG. 6b is employed. Therein, the front wheels 17a and 17b are steered to the right whereas the middle wheels maintain their straight ahead position and the rear wheels are actually steered to the left.

Figure 7A:
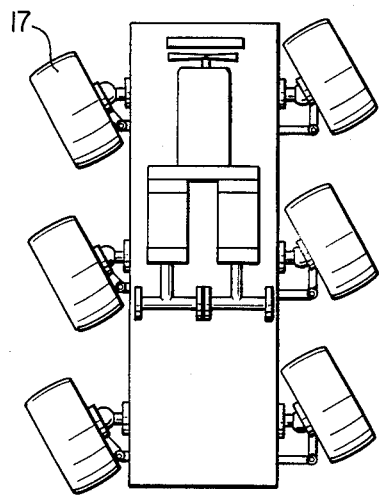
FIG. 7a indicates a mode of steering where there is a crab steer to the left.
Figure 7B:
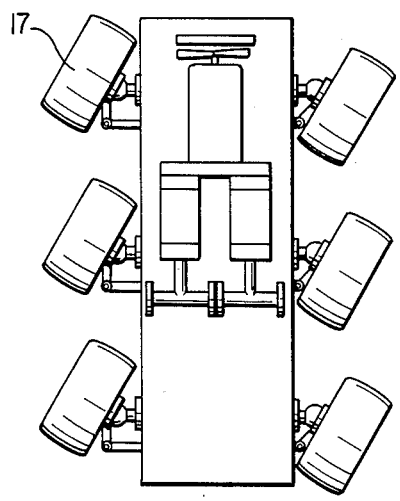
FIG. 7b indicates a mode of steering where there is a crab steer to the right.
Figure 8:
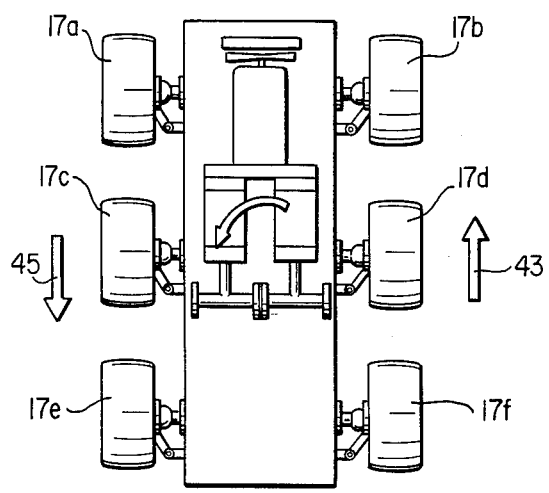
FIG. 8 illustrates schematically a mode in which there can be counter-rotation of right or left wheels to effect pivotal movement for steering about the center of the vehicle.

On the other hand, if a crab steer steering mode is employed, there is a crab steer in which all of the wheels 17 are steered in the same direction such as illustrated in FIG. 7a where a crab steer to the left actually allows the vehicle to move on a trajectory to the left of the center line of the vehicle. Similarly, in FIG. 7b, the wheels 17 are all steered to the right for a crab steer to the right which moves a trajectory to the right of the center line of the vehicle.

In similar vein, if it is desired to steer by causing the vehicle to pivot about its own centerpoint, the respective wheels may be driven in opposite directions. For example, as shown in FIG. 8, the right wheels 17b, 17d and 17f may be caused to move in the forward direction, indicated by the arrow 43, whereas the wheels 17a, 17c and 17e may be caused to move in the opposite direction, as shown by arrow 45. Expressed otherwise, the respective wheels on each side can be driven any particular direction desired. The direction that they are driven can be controlled manually or it can be controlled by a computer arrangement in the steering means 21, as shown in the embodiment of FIGS. 5 and 8.

In operation, the respective wheels 17 are connected, as by way of U-joints and ball joints or the like to the respective transmission means for power and the steering means for steering. The steering means are interconnected as described so that each of the respective wheels can be steered responsive the steering means 21. Expressed otherwise, referring to FIG. 2, the wheel can be steered such that the front end of the wheels may go to either the left or the right, responsive to the steering interconnection 23 moved appropriately by manual or computer control means in response to the steering means 21. With the rigid frame the entire vehicle moves like a barge such that even if one wheel drops into a hole, the weight is increased on the others so the ground traction will remain constant. This is not done by the prior art flexible walking beam wheel mountings.

The interconnecting chains or the like in the panels on each of the respective sides allow transmitting any degree of torque desired depending upon the size of the off-road vehicle.

The axles with ball steerings are made in all sizes with respective axles that will transmit the necessary torque to power up to 70,000 pounds per axle. For example, the RT-1650, made by Clark, had such axles. With this machine approach, a machine of only 170,000 pounds can be suitably powered with only three axles and three sets of wheels on each side. Expressed otherwise, each axle will allow up to 60,000 pounds conventional with special design up to 70,000 pounds to give more than adequate capacity. In fact, Grove Co., who employs these axles, advertise that they can actually pick up and traverse with 420,000 pounds on four axles. The Grove vehicle demonstrates that this technology has a considerable safety factor.

Figure 9A:
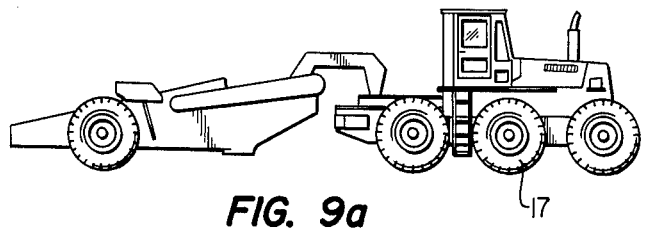
FIGS. 9(a-g) represent several schematic illustrations of other types of vehicles that can employ the apparatus of this invention.
Figure 9B:
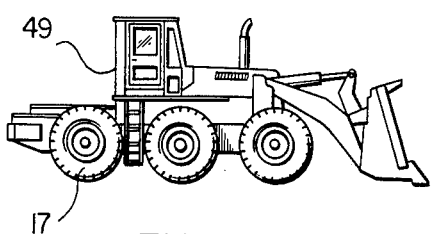
Figure 9C:
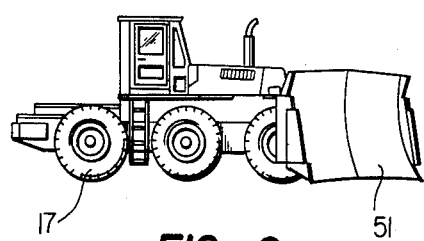
Figure 9D:
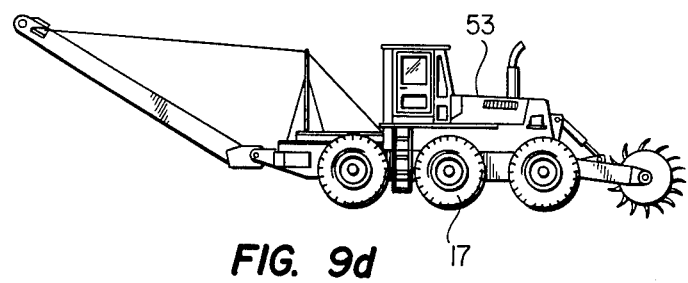
Figure 9E:
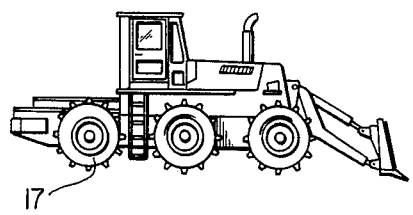
Figure 9F:
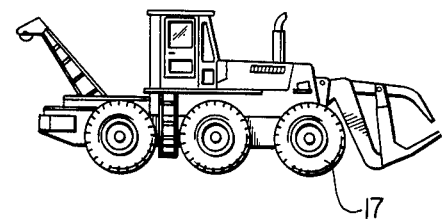
Figure 9G:
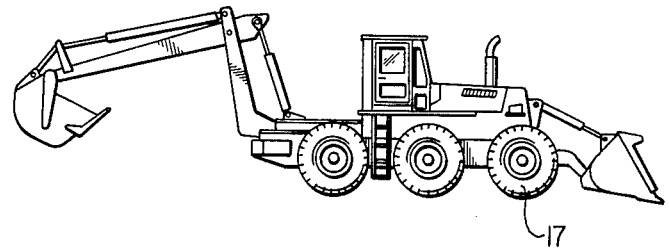

Other types of vehicles can employ this technology. For example, as can be seen in FIG. 9a, a pull scraper or pull trailer could readily employ the respective wheels 17 on each of the sides to give the necessary traction. Similarly, the front end loader 49 of FIG. 9b, could employ the wheels 17 to give the necessary traction. The angled dozer blade 51 of FIG. 9c could employ the wheels 17 to get the necessary crab steer and give the necessary force to push the dozer blade. In like manner, a continuous excavator 53, FIG. 9d, could employ the wheels 17 for respective movement as desired. Similarly, compactors, skidders and backhoe loaders of FIGS. 9(e-g), could employ the respective wheels 17 for motivational power to move along a particular azimuth, or as desired and steered.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In an off-highway vehicle having a prime mover power source; a chassis; a plurality of wheels supporting said chassis; power transmission means for usably conveying power from said prime mover power source to said wheels; and steering means connected with at least a pair of said wheels for steering, the improvement comprising:
   a. a plurality of wheels on each side of said chassis with each said plurality of said wheels on each side of said chassis being mechanically lockedly and commonly connected together and to the transmission means such that all said wheels rotate together and only together; each of said wheels in each of said plurality of wheels being mounted also so as to be steerable; and
   b. said steering means having a plurality of modes with a selector means for selecting one of said plurality of steering modes such that said steering means has the capability of steering said wheels in accordance with said selected modes; said steering means being operably connected with each and every one of said wheels for effecting steering of said wheels in said selective one of said plurality of selectable modes such that traction of said vehicle remains constant even if one wheel loses contact with the ground.

2. The vehicle of claim 1 wherein said chassis comprises a rigid frame and said wheels support said rigid frame without articulation of a pivotally mounted frame member.

3. The vehicle of claim 1 wherein said power source includes one engine powering a hydraulic pump, wherein said transmission means for supplying hydrostatic power and includes hydraulic lines supplying said hydrostatic power to connected hydraulic motors, one on each side for delivering torque for powering said wheels.

* * * * *